United States Patent [19]

Ponto

[11] 4,239,938

[45] Dec. 16, 1980

[54] MULTIPLE INPUT SIGNAL DIGITAL ATTENUATOR FOR COMBINED OUTPUT

[75] Inventor: Robert A. Ponto, Louisville, Ky.

[73] Assignee: Innovative Electronics Design, Louisville, Ky.

[21] Appl. No.: 4,197

[22] Filed: Jan. 17, 1979

[51] Int. Cl.[3] ............................................ H04M 1/60

[52] U.S. Cl. .................................. 179/1 VL; 323/80; 328/173; 455/251

[58] Field of Search ............. 179/1 VL, 1 CN, 1 VC, 179/15 BL, 1 AT; 307/264; 328/168, 173; 325/404; 323/80

[56] References Cited

U.S. PATENT DOCUMENTS

| | | | |
|---|---|---|---|
| 3,569,958 | 3/1971 | Gabriel | 364/608 X |
| 3,887,875 | 6/1975 | Shearer et al. | 328/173 X |
| 3,992,584 | 11/1976 | Dugan | 179/1 VL X |

OTHER PUBLICATIONS

The Engineering Staff of Analog Devices, Inc., Analog-Digital Conversion Handbook, 6/1972, pp. I-42 to I-49, II-43 to II-51.

*Primary Examiner*—Thomas J. Sloyan
*Attorney, Agent, or Firm*—Edward M. Steutermann

[57] ABSTRACT

A digital attenuator to stepwise modify multiple controlled signals including generator to provide counter signals at selected frequency, a counter to count the signals having multiple counter outputs to provide a counter output signal when activated and adapted to selectively activate each counter output in selected sequence in response to selected numbers of counter signals so the counter provides a repeated pattern of output signals at the output means to provide a counter output control cycle, multiplexer having a selected number of multiplex signal inputs each adapted to receive binary input signals from selected signal generator multiplex control means to selectively connect each of the multiplex inputs is connected to the multiplex outputs during each counter output control cycle, signal storage device having an input connected to the multiplex outputs to store the multiplex output signals to provide a stored binary signal indicative of the sum of the number of multiplex output signals received during one counter cycle, signal attenuator having multiple attenuator signal inputs of different impedance each adapted to receive controlled signals and provide an attenuated signal output, an attenuator controller including attenuator switches to interconnect selected attenuator inputs with the attenuated signal output where the attenuator controller includes signal inputs to receive the stored binary signal and activate the attenuator controller in response thereto to selectively interconnect a portion of the attenuator signal input with the attenuated signal output.

7 Claims, 3 Drawing Figures

MULTIPLE INPUT SIGNAL DIGITAL ATTENUATOR FOR COMBINED OUTPUT

BACKGROUND OF THE INVENTION

The present invention relates to systems to periodically attentuate an electrical signal in response to changes in selected conditions. Signal attenuation means are utilized in numerous applications from highly sophisticated applications such as computers to more straightforward applications in simple electrical or electromechanical devices.

Signal attenuation can, of course, be accomplished manually by observation of the situation to be controlled and manual manipulation of the signal control means. In the alternative, attenuation is accomplished by sensing devices responsive to the condition to be controlled and use of devices to automatically attenuate signals to controllers affecting the condition to be controlled.

In one application of the foregoing, specifically in electronic circuitry, attenuation can be accomplished by the use of amplifier means for the controlled or a controller signal with continuous feedback and gain adjustment of the amplifier circuit. Such arrangements provide satisfactory control in some instances but in other applications, for example in attenuation of the output of multiple input sound actuated sound amplification systems, such arrangements have been less satisfactory than desired. Also, such systems are subject to distortion resulting from transient and feedback effects.

Other attenuation methods have provided for stepwise, rather than continuous attenuation. Such arrangements have generally been manually controlled and where automatic control has been provided as disclosed in an article entitled "Automatic Attenuator Rapidly Changes Signal Level", Electronics, Sept. 15, 1969 at page 120 have utilized continuous monitor of incoming signals to shift attenuation levels. Such systems have been found less than desirable in sound amplification because the rapid switching of output channels leads to undesirable interference with the quality of transmitted program material.

Additionally, no attenuation device is known which can be utilized to attenuate an output signal in response to a large number of input signals where the state of the input signals is summed and changes in attenuation are effected in response to the change in the sum rather than in response to the change in individual inputs.

SUMMARY OF THE INVENTION

The present invention provides a signal attenuator arrangement where a signal is stepwise attenuated as a function of the total number of control signals received by the attenuator from control signal generator source means.

The attenuated signal can be another control signal or can, for example be an output signal to an audio amplifier where the control signals can be generated as a function of the number of active microphones in a sound actuated sound amplification system.

In such devices, several controlled input channels of different impedance are provided where the attenuator selects the input channel to be utilized as a function of the sum of the number of control signals supplied to the attenuator.

The activation or deactivation of any individual signal input does not affect the attenuation of the controlled signal. Rather, attenuation is achieved as a result of the change in the sum of the signals to provide smoother operation with less likelihood of undesirable noise or transients.

More particularly, the present invention includes a digital attenuator to stepwise modify a controlled signal including pulse generator means to provide repeated pulse-like signals at selected frequency, counter means having input means to receive and count the pulse-like signals from the pulse generator and having multiple counter output means where each output provides counter output signal when activated and where the counter means is adapted to selectively activate and deactivate each counter output in selected sequence in response to receipt of selected numbers of pulse-like signals by the counter so the counter provides a regular pattern of output of signals at the output means which pattern is repeated on a regular basis to provide a counter output control cycle, multiplex means having a selected number of multiplex signal input means each adapted to receive binary input signals from selected signal generator source means, multiplex control means activated by the counter output signals to selectively and sequentially connect each of the multiplex input means to multiplex output means so each of the multiplex inputs is connected to the multiplex output means during each counter output control cycle, signal storage means having an input means connected to the multiplex output means to store the multiplex output signals to provide a stored binary signal indicative of the sum of the number of selected multiplex output signals received from the multiplex output means, attenuator means having multiple attenuator signal input means each adapted to receive the controlled signal and each with different electrical impedance characteristics and an attenuated signal output, attenuator control means including attenuator switch means to interconnect selected controlled signal input means with the attenuated signal output where the attenuator control means includes signal input means to receive the stored binary signal from the storing means and activate the attenuator control means in response thereto to selectively interconnect a portion of the attenuator signal input means with the attenuated signal output.

As will be noted from the following description, the attenuation arrangements in accordance with the present invention rely on the use of binary type input signals which can be generated as functions of the binary signals, which can be direct current voltage signals and from time to time will be referred to as a "0" and "1" signal and need not be of uniform characteristic but, insofar as the input to the multiplex means is concerned, can be of any value consistent with satisfactory operation of the multiplex device.

It will also be understood that various other arrangements within the scope of the present invention will become obvious to those skilled in the art upon reading the disclosure of one arrangement within the scope of the present invention.

BRIEF DESCRIPTION OF THE DRAWINGS

Referring now to the Figures which illustrate one example of an arrangement in accordance with the present invention.

Figure 1:
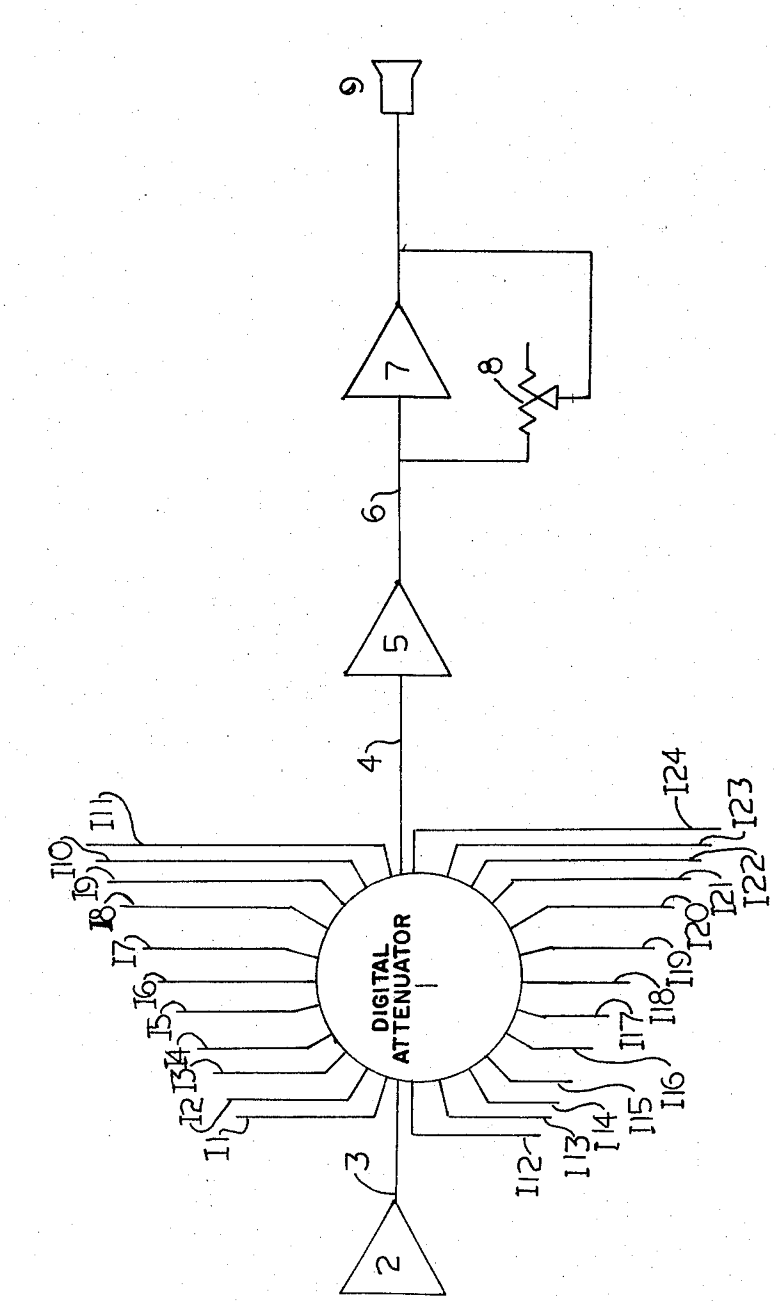
FIG. 1 is a schematic block diagram of an application in accordance with the present invention.

Referring first to FIG. 1, where an illustration is shown utilizing a digital attenuator 1, in accordance with the present invention, a signal generator, for example a program amplifier 2, supplies a program input 3 to digital attenuator 1 where the program transmission from amplifier 2 is attenuated stepwise as described hereinafter. Briefly, digital attenuator 1 stepwise attenuates depending upon the sum of the number of activated control inputs I1–I24 as described hereinafter. Output 4 from the digital attenuator is then supplied to a preamplifier 5 having an output 6 supplied to an adjusting amplifier 7, having gain control circuit 8 and thence to an output speaker 9 as as known in the art.

Each of the adjusting inputs I1–I24 can be adapted to be provided with a binary type switching signal from a selected source (not shown) where the number of inputs I1–I24 actuated is determined by the state or characteristic of the circumstance to be controlled. Input program 3 can, for example, be the signal to be controlled and inputs I1–I24 can be indicative of the degree of control required. For example, in a multi-microphone input audio system where each activated microphone provides an input to the program and is also provided with a channel which is activated by a program supplied to the microphone, the indicated inputs I1–I24 would each be provided from a microphone input and be activated when the microphone is on so that the total program is attenuated in response to the total number of activated microphones.

As described more particularly hereinafter, the attenuation can be a function of changes in the sum of the activated channels and not a function of the state of activation of any particular input channel.

Figure 2:
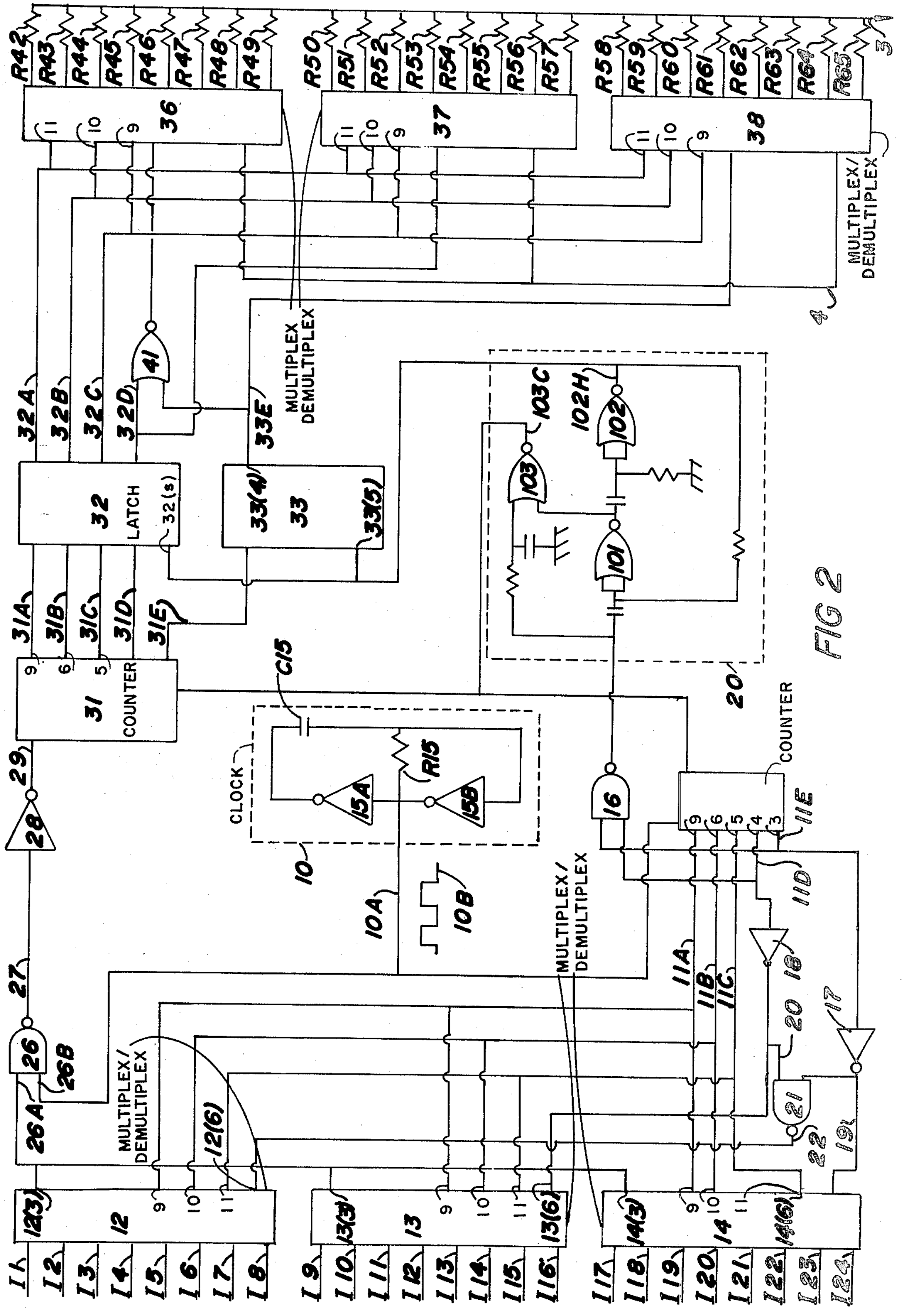
FIG. 2 is a detailed schematic illustration of an example of a digital attenuator in accordance with the present invention.

Referring now to FIG. 2, which is an illustration of one arrangement of an attenuator in accordance with the present invention, a clock 10 having an output 10A is provided. A pulsed output illustrated as 10B is supplied from clock 10 in the form of a square wave which can be used as a binary signal. Clock 10 is of the type known in the art which includes inverters 15A and 15B with a cooperative resistor R15 and capacitor C15. As is known in the art, the period of the clock is determined by the relative values of resistor R15 and capacitor C15.

It will be recognized that the following is but one example of an arrangement in accordance with the present invention utilizing elements selected to accomplish the objectives of the particular design. That is, in the example shown, the arrangement is provided to have 24 signal inputs and 24 impedance circuits for the signal to be controlled but in other applications, other equivalent elements can be selected to provide the desired objectives.

In the example shown in FIG. 2, output 10A from clock 10 is supplied to a binary counter 11, for example, a seven-stage ripple counter (part no. 4024, Radio Corporation of America, TM). Clock input 10A is supplied at the clock input terminal of binary counter 11 where output pins, 9, 6 and 5 are then connected as shown to input pins 11, 10 and 9 each of three inter-locked multiplexers/demultiplexers 12–14. For convenience, the output from pin 9 of counter 11 is designated output 11A, the output from pin 6 is designated as output 11B, and the output from pin 5 is designated as output 11C.

The outputs from binary counter 11, as is known in the art and described in more detail hereinafter, supply square wave signals of varying period depending on the number of input pulses which have been received by the counter at any particular time. The example of the present invention shown in the Figures utilizes the different signal periods at the different outputs as described hereinafter.

The output from pin 4 of binary counter 11 is designated as output 11D and is supplied to the input of a NAND gate 16, for example, a part no. 4011, Radio Corporation of America (TM) and to the input of an inverter 18, for example, Signal Inverter part no. 4049, Radio Corporation of America (TM).

Output from pin 3, designated as output 11E from binary counter 11 is supplied to the other input of NAND gate 16 and to a second inverter 17 similar to inverter 18.

Outputs 19 and 20 from inverters 17 and 18 are supplied to the inputs of a NAND gate 21 where the output 22 of NAND gate 21 and the outputs 19 and 20 of inverters 17 and 18 are provided to the inhibit inputs of demultiplexers 12–14.

In the example of the present invention shown in the Figures, three multiplexers/demultiplexers 12–14 are provided and connected to act as one unit. To accomplish this, the inhibit input (pin 6) designated respectively as 12(6), 13(6) and 14(6) of each is utilized where its inhibit inputs provide for selective deactivation of the demultiplexers usually in response to a "1" or positive count at inputs 19, 20 or 22. Thus two of the multiplexers/demultiplexers are always off while the scan sequence described hereinafter is occuring in the active unit. The elements of binary counter 11, NAND gates 16 and 21 and inverters 17 and 18 provide the operative output for demultiplexers 12–14. Each demultiplexer is provided with a series of inputs I1–8, I9–I16, I17–I24 corresponding to the inputs reflected on FIG. 1. These inputs can be binary inputs which, for example, can be designated as "0" and "1". These input signals are received and ultimately transmitted to provide the selected attenuation by the multiplexer/demultiplexer inputs indicating, in the example shown, which of the input or microphone channels is active and the number of active channels is used to control the controlled signal from output 3 of amplifier 2.

Now with reference to counter 11, the counter can, for example, be a divide-by-eight counter with any number of stages sufficient to accomplish the objectives of the device. In the example shown, a seven-stage counter is used but not all stages are needed for the application shown so a reset utilizing NAND gate 16 is provided as described hereinafter.

Figure 3:
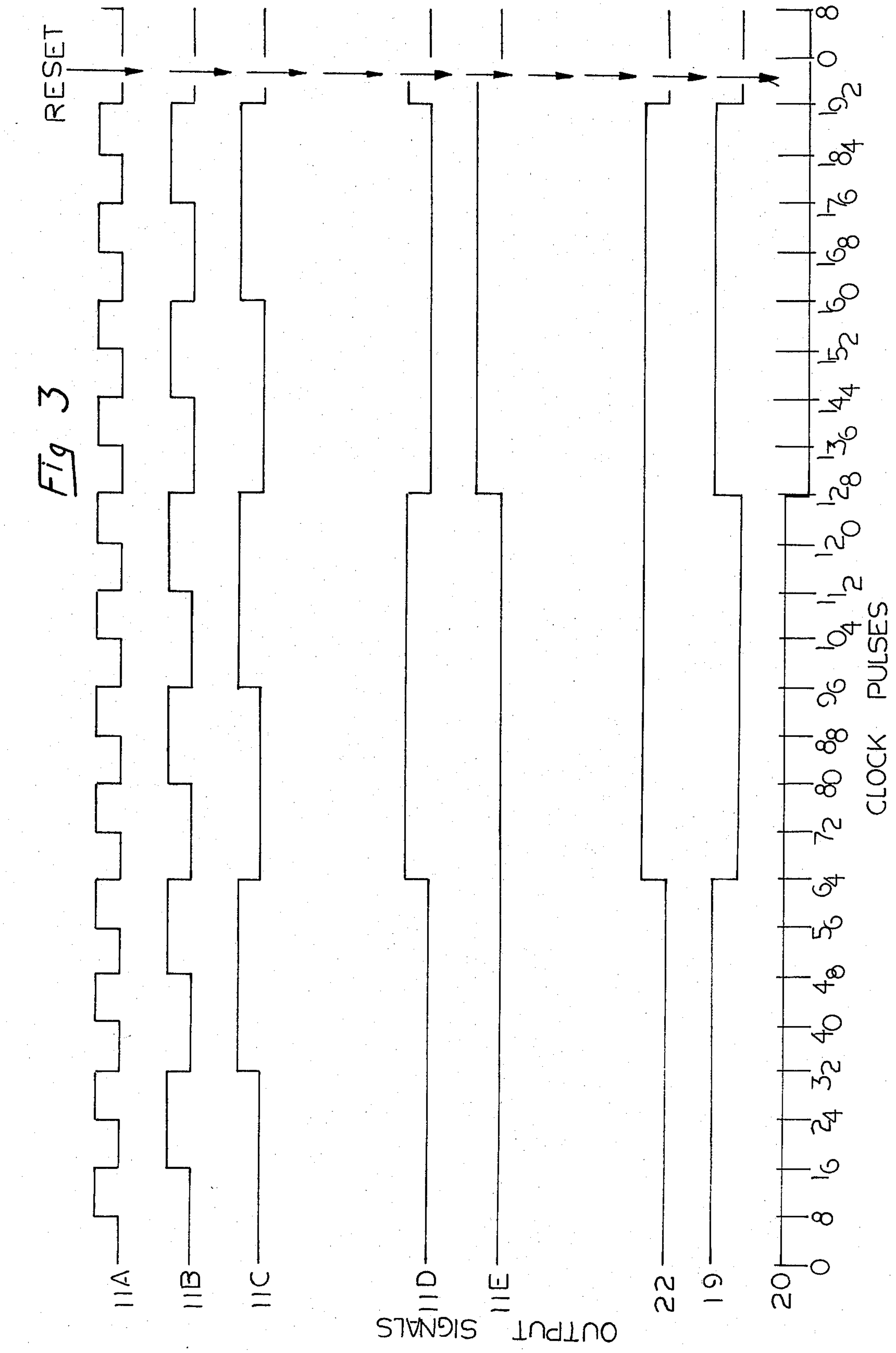
FIG. 3 is a graphic illustration of operation of a portion of the example of the device shown.

In operation as graphically illustrated in FIG. 3 with reference to outputs 11A–11E of counter 11 and inputs 20, 21 and 22 to multiplexer/demultiplexers 12–14, the sequence of the state of the various inputs and outputs are shown.

Initially, it should be recognized that outputs 11A–11E are normally "0" while multiplexers/demultiplexers 12–14 are on in response to a "0" input. In the arrangement shown, outputs 11A–11E are "0" for the first eight counts. In this period, outputs 11E and 11D are "0" so inverter outputs 19 and 20 are "1" to disable multiplexers/demultiplexers 13 and 14. Output 22 from NAND gate 21 is "0", as shown, so multiplexer/demultiplexer 12 is on and inputs I1–I8 are being scanned in response to the binary signals received from outputs 11A–11C of counter 11. The sequence of outputs 11A–11C for 64 counts is shown in Table #1 for the first phase of the operation for one cycle.

TABLE #1

STATE OF OUTPUTS 11A-11C AND CORRESPONDING ACTIVATION OF INPUTS OF ASSOCIATED THEN ACTIVE MULTIPLEXER/DEMULTIPLEXER

| Counter | Output | State | Multiplexer/Demultiplexer Input On |
|---|---|---|---|
| 11A | 11B | 11C | — |
| 0 | 0 | 0 | I1 |
| 1 | 0 | 0 | I2 |
| 0 | 1 | 0 | I3 |
| 1 | 1 | 0 | I4 |
| 0 | 0 | 1 | I5 |
| 1 | 0 | 1 | I6 |
| 0 | 1 | 1 | I7 |
| 1 | 1 | 1 | I8 |

When a multiplexer/demultiplexer output is on the signal, in this case the binary signal "0" or "1" indicating a deactive or active input channel is transmitted to input 26A of NAND gate 26.

As illustrated in FIG. 3, after 64 counts when all 8 of the inputs I1–I8 of multiplexer/demultiplexer 12 have been scanned, output 11D goes high so that output 20 from inverter 18 goes low or "0" enabling multiplexer/-demultiplexer 13 while multiplexers/demultiplexers 12 and 14 are disabled so by the sequence shown in Table #1 inputs I9–I16 are scanned. Finally, at the end of 128 clock pulses, counter output 11D goes low disabling multiplexer/demultiplexer 13 and output 11E goes high so output 19 from inverter 17 goes low enabling multiplexer/demultiplexer 12 to scan inputs I17–I24 to complete one counter cycle as described hereinafter.

At the end of 96 pulses, counter output 11D again goes high. It should be noted that during the last two phases of the cycle, outputs 11D and 11E were different. These outputs provide the input to NAND gate 16 so that at the completion of 96 clock pulses when both outputs 11D and 11E are "1", the output from NAND gate 16 goes to "0" initiating reset circuit 20 (described hereinafter) to reset counter 11 (and counter 31 also described hereinafter) to start a new cycle.

During the period when each of the multiplexers/-demultiplexers 12–14 are on, the input signals I1–I24 are noted at one input to NAND gate 26 as each clock pulse is transmitted from clock 10 to the other input to NAND gate 26 to sequence the input gate. The output 27 from NAND gate 26 is supplied to the input 27 of an inverter 28, for example a part no. 4049, Radio Corporation of America (TM). The output 29 from inverter 28 is supplied to the input of a binary counter 31, for example, part no. 4024, Radio Corporation of America (TM) where outputs 31A–31C corresponding to pins 9, 6 and 5 provide a summed binary number output. Outputs 31A–31C are supplied to a quad-latch 32, for example a part no. 4042 Radio Corporation of America (TM) upon receipt of a signal at pin 32(5) from reset circuit 20 as described hereinafter. Output 31E from counter 31 is supplied to pin 4 of a second quad-latch 33, for example part no. 4042, Radio Corporation of America (TM) to cooperate with output 32D of quad-latch 32 to select one of the multiplexer/demultiplexers 36–38 to attenuate signal 3.

Outputs 32A–32C of quad-latch 32 provide the binary number output while output 32D and 33E from quad-latches 32 and 33 provide the inhibit/disinhibit function for cooperative multiplexers/demultiplexers.

Input 32A–32C from quad-latch 32 is supplied to pins 11, 10 and 9 of demultiplexers respectively. Output 32D of quad-latch 32 and 33E of quad-latch 33 are supplied to the input gates of a NAND gate 41 to selectively inhibit the operation of multiplexer/demultiplexer 37. Output 32D, as shown, is supplied to the inhibit gate of demultiplexer 38 while output 33E is supplied to the inhibit gate of multiplexer/demultiplexer 39. Accordingly, operation of the multiplexer/demultiplexer to be activated is selected in accordance with the outputs from quad-latches 32 and 33. In accordance with one feature of the present invention, the input 3 with reference to FIG. 1, from the signal generator is supplied through impedance devices, for example resistors 46–64 in parallel on the input of multiplexers/demultiplexers 36–38 where each resistor is connected to one of the eight inputs of each of the multiplexers/demultiplexers 36–38. The binary code provided to one of the multiplexers/demultiplexers by the previously described elements selects at least one of the inputs 42–65 to be utilized where the input to be utilized is then supplied to output 4 for transmission and where output 4 provides the attenuated signal.

With reference again to FIG. 2, output from NAND gate 16 is supplied to a delay circuit 20 including NOR gates 101, 102 and 103 adapted to provide an output 103C from NOR gate 103 and an output 102H from NOR gate 102 where output 102H is supplied to the load function pins 32-5 and 33-5 of quad-latches 32 and 33 while output 103C is provided to the reset of binary counters 11 and 31. Advantageously, there is a slight delay time between the pulse provided by output 102H and the pulse provided by output 103C where pulse 102H occurs first to load the quad-latches 32 and 33 from the output of binary counter 31, and subsequently, output 103C is activated to reset binary counters 11 and 31.

It will be understood that various other arrangements within the scope of the present invention will occur to those skilled in the art upon reading the foregoing disclosure and that the scope of the present invention is to be limited only by the claims appended hereto.

The invention claimed is:

1. Digital attenuator means to stepwise modify a program signal to be controlled including:

(a) signal pulse generator means to provide repeated pulse-like counting signals;

(b) first counter means having:

(i) counter input means to receive said counting signals;

(ii) multiple first counter output means each providing a first counter output signal when activated;

(iii) first counter control means to count said counting signals and selectively activate and deactivate each of said first counter output means in selected patterns in response to selected numbers of counting signals so said first counter provides a selected pattern of first counter output signals from a portion of said first counter output means to define a first counter output control cycle;

(c) multiplex means having:

(i) a selected number of multiplex signal inputs each adapted to receive a single bit binary input signal from selected signal generator source means;

(ii) multiplex output means to selectively receive said binary input signals from said multiplex signal inputs;

(iii) Multiplex control means having input means to receive said first counter output signals and selectively and individually connect selected multiplex inputs to said multiplex output means during a first counter cycle to transfer said binary input signals to said multiplex output in response to receipt of said first counter output signals;

(d) second counter means to count the number of binary signals received from said multiplex output means during a selected time period and transfer the counted signals as a binary attenuator control number to second counter output means;

(e) attenuator means having:

(i) multiple parallel attenuator inputs each adapted to be selectively activated and each adapted to receive said program signal to be controlled and a portion thereof having mutually different electrical impedance valves;

(ii) attenuator output means adapted to receive an attenuated program signal from the portion of said attenuator inputs which are activated; and (iii) attenuator control means including attenuator switch means connected to said second counter output means to receive said second counter binary attenuator control member and adapted to activate selected attenuator inputs to provide an attenuated output program signal.

2. The invention of claim 1 wherein said selected time period is the time elapsed during said counter output control cycle.

3. The invention of claim 1 including signal storage means having an input connected to said multiplex output means to receive said binary input signals and store same, signal storage means output connected to said second counter means and transfer control means to selectively transfer stored binary signals to said attenuator input control means at the end of a selected time cycle.

4. The invention of claim 3 wherein said selected time cycle is the time elapsed during said counter output control cycle.

5. The invention of claim 3 including reset means to reset said second counter and activate said signal storage transfer control means at the end of each counter output control cycle.

6. The invention of claim 5 including delay means to delay reset of said second counter until completion of transfer of stored binary signals to said attenuator input control means.

7. The invention of claim 1 wherein said signal to be controlled is an audio-generated electrical signal and said signal generator source means are active audio inputs to said audio-generated electrical signal which provides binary signals.

* * * * *